`US 12,481,768 B1`

(12) United States Patent
Lonigro

(10) Patent No.: US 12,481,768 B1
(45) Date of Patent: *Nov. 25, 2025

(54) CYBERSECURITY VULNERABILITY MANAGEMENT PROGRAM EVALUATION SYSTEM

(71) Applicant: United Services Automobile Association (USAA), San Antonio, TX (US)

(72) Inventor: Michael Emil Lonigro, Canyon Lake, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/767,063

(22) Filed: Jul. 9, 2024

Related U.S. Application Data

(63) Continuation of application No. 17/717,741, filed on Apr. 11, 2022, now Pat. No. 12,067,125.

(51) Int. Cl.
  *G06F 21/57* (2013.01)
(52) U.S. Cl.
  CPC .................. *G06F 21/577* (2013.01)
(58) Field of Classification Search
  None
  See application file for complete search history.

(56) References Cited

U.S. PATENT DOCUMENTS

| | | | |
|---|---|---|---|
| 5,913,201 A | 6/1999 | Kocur | |
| 7,617,117 B2 | 11/2009 | Starkey | |
| 8,239,249 B1 | 8/2012 | Belko et al. | |
| 8,799,243 B1 | 8/2014 | Havlik | |

(Continued)

FOREIGN PATENT DOCUMENTS

CA    3084760 A1    12/2020

OTHER PUBLICATIONS

Shuo Zhang and Krisztian Balog. Auto-completion for Data Cells in Relational Tables. In Proceedings of the 28th ACM InternationalConference on Information and Knowledge Management (CIKM '19). Association for Computing Machinery, USA, 761-770. Nov. <https://doi.org/10.1145/3357384.3357932> (Year: 2019).

(Continued)

*Primary Examiner* — Fatoumata Traore
(74) *Attorney, Agent, or Firm* — Potomac Law Group, PLLC; Dannon G. Allbee

(57) ABSTRACT

Methods and systems described herein are directed to measuring cybersecurity vulnerability management programs and readiness. A vulnerability management program evaluation system can define vulnerability management capabilities and technologies supporting execution of those capabilities. Once defined, the system can conduct an initial assessment including scoring for the capabilities representing a depth of vulnerability management, as well as scoring for the technologies representing a breadth of vulnerability management. To update the initial assessment, the system can track the ongoing progress of projects that can affect the depth and/or breadth of vulnerability management, and then recalculate the scoring. At any time, the system can combine the depth and breadth to determine a comprehensive vulnerability management score.

15 Claims, 12 Drawing Sheets

(56) References Cited

U.S. PATENT DOCUMENTS

| | | |
|---|---|---|
| 8,874,619 B2 | 10/2014 | Mack |
| 10,346,762 B2 | 7/2019 | Greenspan et al. |
| 11,734,609 B1 | 8/2023 | Breckenridge et al. |
| 11,930,032 B2 * | 3/2024 | Campbell ............. G06F 21/577 |
| 12,056,130 B1 | 8/2024 | Ayala et al. |
| 2002/0078381 A1 * | 6/2002 | Farley .................... H04L 43/00 |
| | | 726/23 |
| 2003/0028411 A1 | 2/2003 | Grenchus, Jr. et al. |
| 2004/0186852 A1 | 9/2004 | Rosen |
| 2005/0055230 A1 | 3/2005 | Chen |
| 2005/0055231 A1 | 3/2005 | Lee |
| 2008/0086342 A1 | 4/2008 | Curry et al. |
| 2008/0288317 A1 | 11/2008 | Kakar |
| 2008/0306750 A1 | 12/2008 | Wunder et al. |
| 2012/0072460 A1 | 3/2012 | Friedlander et al. |
| 2012/0239585 A1 | 9/2012 | Bailey |
| 2014/0058801 A1 | 2/2014 | Deodhar et al. |
| 2014/0108656 A1 | 4/2014 | Salinca et al. |
| 2015/0248532 A1 | 9/2015 | Rajasenan |
| 2017/0091670 A1 | 3/2017 | Gulin et al. |
| 2018/0322292 A1 * | 11/2018 | Tedeschi ............. H04L 63/1433 |
| 2018/0341782 A1 * | 11/2018 | Barday ................... H04L 63/04 |
| 2019/0156291 A1 | 5/2019 | Nayak et al. |
| 2019/0207968 A1 * | 7/2019 | Heckman ............ H04L 63/1433 |
| 2019/0207981 A1 * | 7/2019 | Sweeney ............... H04L 41/145 |
| 2020/0125586 A1 | 4/2020 | Rezaeian et al. |
| 2020/0250782 A1 | 8/2020 | Zaich et al. |
| 2021/0019665 A1 | 1/2021 | Gur et al. |
| 2022/0014169 A1 | 1/2022 | Caron et al. |
| 2022/0270021 A1 | 8/2022 | Glocker |
| 2024/0086859 A1 | 3/2024 | Gillam |
| 2024/0272944 A1 | 8/2024 | Cooke et al. |

OTHER PUBLICATIONS

Maria Vaida, et al., "Semi-Supervised Graph Neural Network with Probabilistic Modeling to Mitigate Uncertainty". In Proceedings of the 2020 the 4th International Conference on Information System and Data Mining, Association for Computing Machinery, 152-156, May (Year: 2020).

* cited by examiner

CYBERSECURITY VULNERABILITY MANAGEMENT PROGRAM EVALUATION SYSTEM

CROSS-REFERENCE TO RELATED APPLICATION(S)

This application is a continuation application of U.S. patent application Ser. No. 17/717,741, titled "Cybersecurity Vulnerability Management Program Evaluation System"; filed Apr. 11, 2022, currently pending, which is herein incorporated by reference in its entirety.

TECHNICAL FIELD

The present disclosure is directed to methods and systems for scoping, improving, and measuring enterprise cybersecurity vulnerability management programs.

BACKGROUND

Individuals and organizations today face increasingly complex and expansive cyber threats aimed at disrupting their networked operations. In the case of organizations, efforts to manage vulnerabilities to these threats can extend across multiple business units and involve complicated technologies. Knowing a current and/or projected state of vulnerability management capabilities can prove instrumental to any ability to manage and ward off potential for operational disruption(s) that could impact a specific business unit or the organization as a whole.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
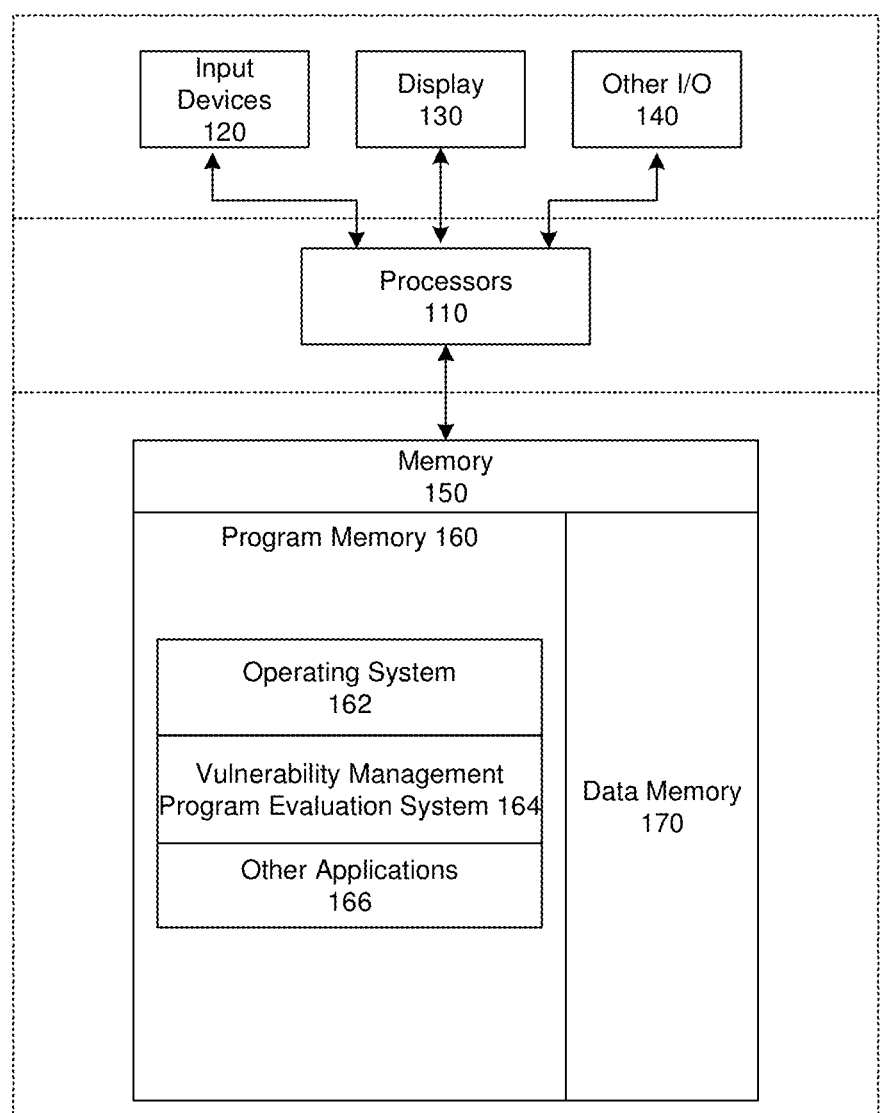
FIG. 1 is a block diagram illustrating an overview of devices on which some implementations can operate.

Aspects of the present disclosure are directed to defining and measuring a current and/or projected cybersecurity vulnerability management program readiness for an organization. A vulnerability management program evaluation system can initially define for the organization vulnerability management capabilities (comprising the program model), maturity tiers for the capabilities (to measure program depth), and also scope and assess the technologies supporting execution of the capabilities (to measure program breadth). Once each of these items is defined, the vulnerability management program evaluation system can assess a current vulnerability management program readiness for the organization by determining a depth of vulnerability management capabilities and a breadth of vulnerability management technologies leveraging those capabilities. Using the effects of one or more completed vulnerability management projects and/or the expected effects of one or more planned vulnerability management projects, the vulnerability management program evaluation system can update the depth and breadth of the organization's vulnerability management program relative to the current level thereof. This way, the vulnerability management program evaluation system can continually reflect present or future preparedness for managing cybersecurity vulnerabilities that could arise from a myriad of sources.

The vulnerability management program evaluation system can initially define the vulnerability management functions and related capabilities of corresponding organizational entities (thereby comprising the program model). For instance, functions such as a management function, an identification function, a response function, and a monitoring function can be defined for the program. Performing these, each of a group of entities including, for instance, an organization's information security unit, vulnerability risk management unit, and information technology unit can have certain capabilities of those functions that it can respectively execute. In these regards, capabilities corresponding to functions can include, but not be limited to, manage health metrics, manage standards, manage scope, manage priorities; identify vulnerabilities, identify inherent risk, identify contextual risk; ticket, plan, and execute as response capabilities; and validate, track, escalate, and provide enterprise risk profile as monitor capabilities.

After the capabilities are defined, the vulnerability management program evaluation system can define maturity tiers that can designate a level of progression for each capability in response to improvement projects. Each of the maturity tiers can be defined by associated milestones that can prescribe whether a respective capability ought to be assigned to one tier or another. Alternatively or in addition, the metrics can be specific to the capabilities such that a capability must satisfy a corresponding capability metric for that capability before it can be assigned to a maturity tier. For instance, if a tier characterizes a stage of capability performance, a corresponding metric for the capability can be a threshold percentage of performance in order to qualify for the tier stage. Thus, only performance of a capability meeting or exceeding the threshold percentage may qualify the capability as being able to be assigned to such a tier. Other examples of tier or capability metrics can include current publication states (in regard to a standards capability, for instance), stages of development (in regard to a scope capability, for instance), etc. Thus, it can be understood that tier or capability metrics can include, for example, a level of completion, a scheduling status, a priority status, etc.

The scope of the vulnerability management program can be captured in the evaluation system. The system can enumerate technologies whose vulnerabilities will be managed according to the model capabilities. A risk level can be assigned to each technology, representing the product of the likelihood and impact that a vulnerability exploited against that technology will present to the enterprise. Mapped against each relevant capability, those technologies can then be assessed for their usage or support of the capabilities. This assessment can be against a scale characterizing that support level as "not implemented;" "implemented tactically;" "implemented strategically;" and useful levels between these. These assessments can yield an average capability support score for each technology. Resources can then be assigned to scope-enhancing projects by priority based on the gap between the risk level of each technology, and the average capability support score for that technology.

Having identified capabilities for vulnerability management, corresponding maturity tiers therefor, and technologies for supporting execution of such capabilities, the vulnerability management program evaluation system can assess a current vulnerability management program readiness for the organization. Such status can be measured for a depth and breadth of vulnerability management capability. A depth of the program can be understood as an extent and maturity of execution of one or more vulnerability management capabilities (i.e., which tiers the cumulative set of capabilities fall into). A breadth of the program can be understood as the degree to which the one or more vulnerability management capabilities are supported by the technologies. The vulnerability management evaluation system can assign each of the capabilities to a maturity tier according to the above-discussed metrics (for the capability or for the tier itself). With such assignment, the system can compute a current vulnerability management depth by scoring each of the capabilities according to respective values corresponding to the maturity tiers. Additionally, the vulnerability management evaluation system can compute a current vulnerability management breadth by scoring each of the technologies supporting execution of capabilities according to a predetermined legend. The legend can outline support states for the technologies. To this end, the support states can define, for instance, one or more of an operational, development, and deployment status of a technology for enabling performance of a respective vulnerability management capability.

The vulnerability management program evaluation system can then combine the depth and breadth scores to calculate a comprehensive vulnerability management score representing the vulnerability management program status or readiness. For any completed and/or planned vulnerability management program projects, the program evaluation system can recalculate the comprehensive vulnerability management program score. In other words, the system can reflect a current and/or a projected state of vulnerability management preparedness where a project can be understood as any effort that can enhance a level of that preparedness. For instance, examples of vulnerability management projects can include, but are not limited to, assessing a compliance standard, deploying a given vulnerability management technology, assessing potential integration of a vulnerability management technology into a vulnerability management system, implementing threat monitoring procedures, etc.

Having calculated the comprehensive vulnerability management score and/or having recalculated the comprehensive vulnerability management program score, the evaluation system can generate a corresponding score report including one or more of these comprehensive scores. The report can further include current vulnerability management scores on a per capability basis and/or on a per technology basis across applicable capabilities. Alternatively or in addition, the report can include recalculations of these current vulnerability management scores with respect to completed and/or planned vulnerability management projects. This way, a user of the system can, with respect to these individual bases, be made visually aware (for comparison purposes, for example) of the depth and breadth of a current and/or a projected status for cyber vulnerability management.

Existing manners of assessing and reflecting a status for cybersecurity vulnerability management can merely provide an aggregated synopsis of available resources. In this regard, such a synopsis is static and merely provides a retrospective overview of abilities for vulnerability management that fails to categorically reflect the depth and breadth of that management. Said alternatively, current reporting for that management status is deficient since it can already be outdated by the time it is assessed. Further, such status indicators tend to be manually created, and thus are subjective to the creator and inconsistent across an organization. Alternatively, implementations according to the present technology provide a fluid and prospective metering for vulnerability management status according to implementing capabilities, as well as according to technologies that can lend support to execution of those capabilities. In this regard, ongoing real-time integrations of assessments of vulnerability management technologies (supporting vulnerability management capabilities) with corresponding assessments of those capabilities enables a comprehensive vulnerability management status to be obtained. Using defined metrics for these capabilities and technologies, the vulnerability management evaluation system provides assessment scores that are consistent and reliable. Such statuses can be obtained, for example, even as a given technology is being deployed or scheduled for deployment. Accordingly, implementations of the present technology cannot only provide a snapshot of vulnerability management status, but also and unlike existing systems, a dynamic measuring for that status.

Several implementations are discussed below in more detail in reference to the figures. FIG. 1 is a block diagram illustrating an overview of devices on which some implementations of the disclosed technology can operate. The devices can comprise hardware components of a device 100 that measures cybersecurity vulnerability management program readiness. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a vulnerability management program evaluation system 164, and other application programs 166. Memory 150 can also include data memory 170, e.g., organizational entities data, vulnerability management capability data, maturity tier data, vulnerability management technology data, project data, project status tracking data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
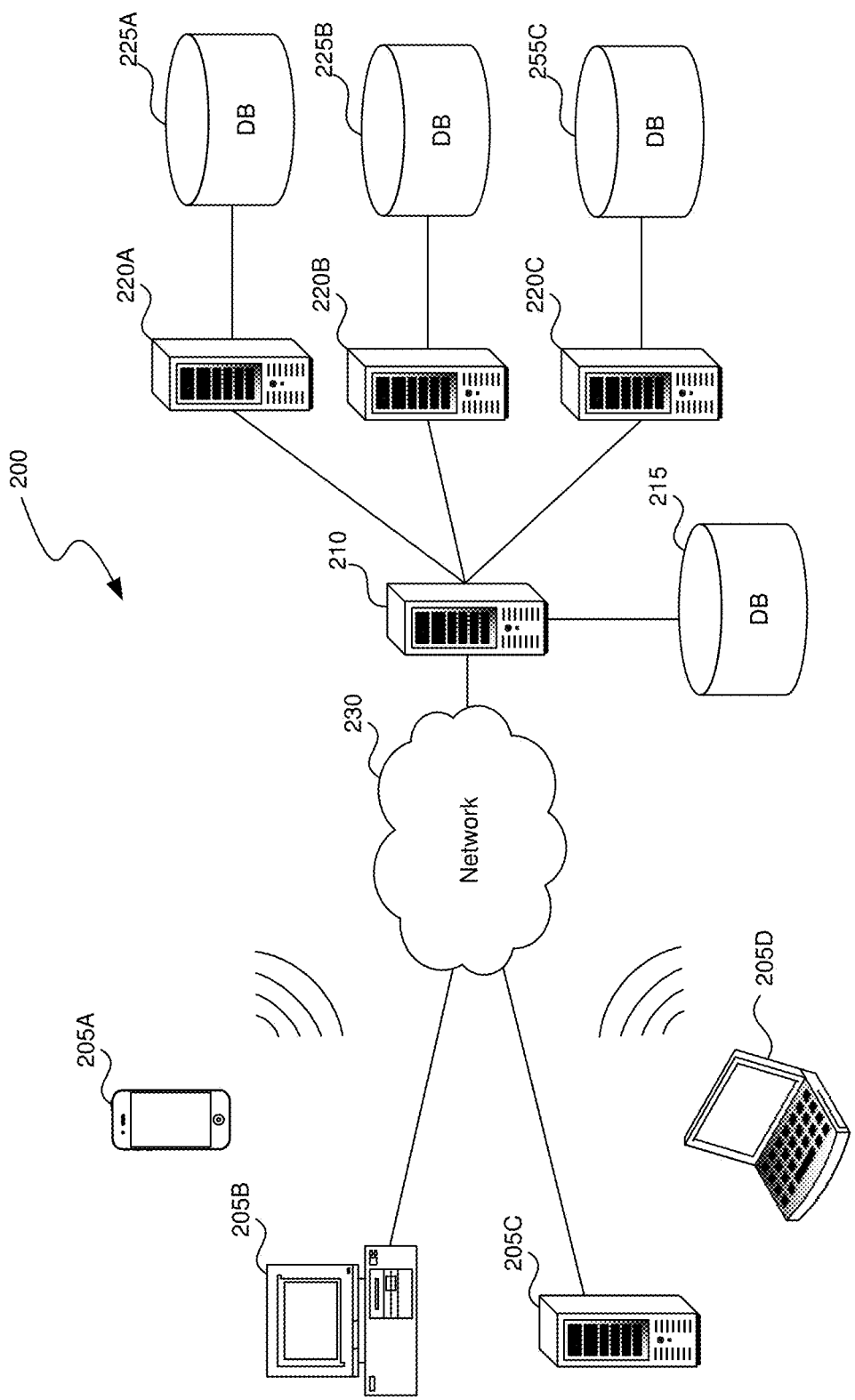
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as organizational entities data, vulnerability management capability data, maturity tier data, vulnerability management technology data, project data, and project status tracking data, that may be on a database for the vulnerability management program evaluation system 164. Though databases 215 and 225 are displayed logically as single units, databases 215 and 225 can each be a distributed computing environment encompassing multiple computing devices, can be located within their corresponding server, or can be located at the same or at geographically disparate physical locations.

Figure 3:
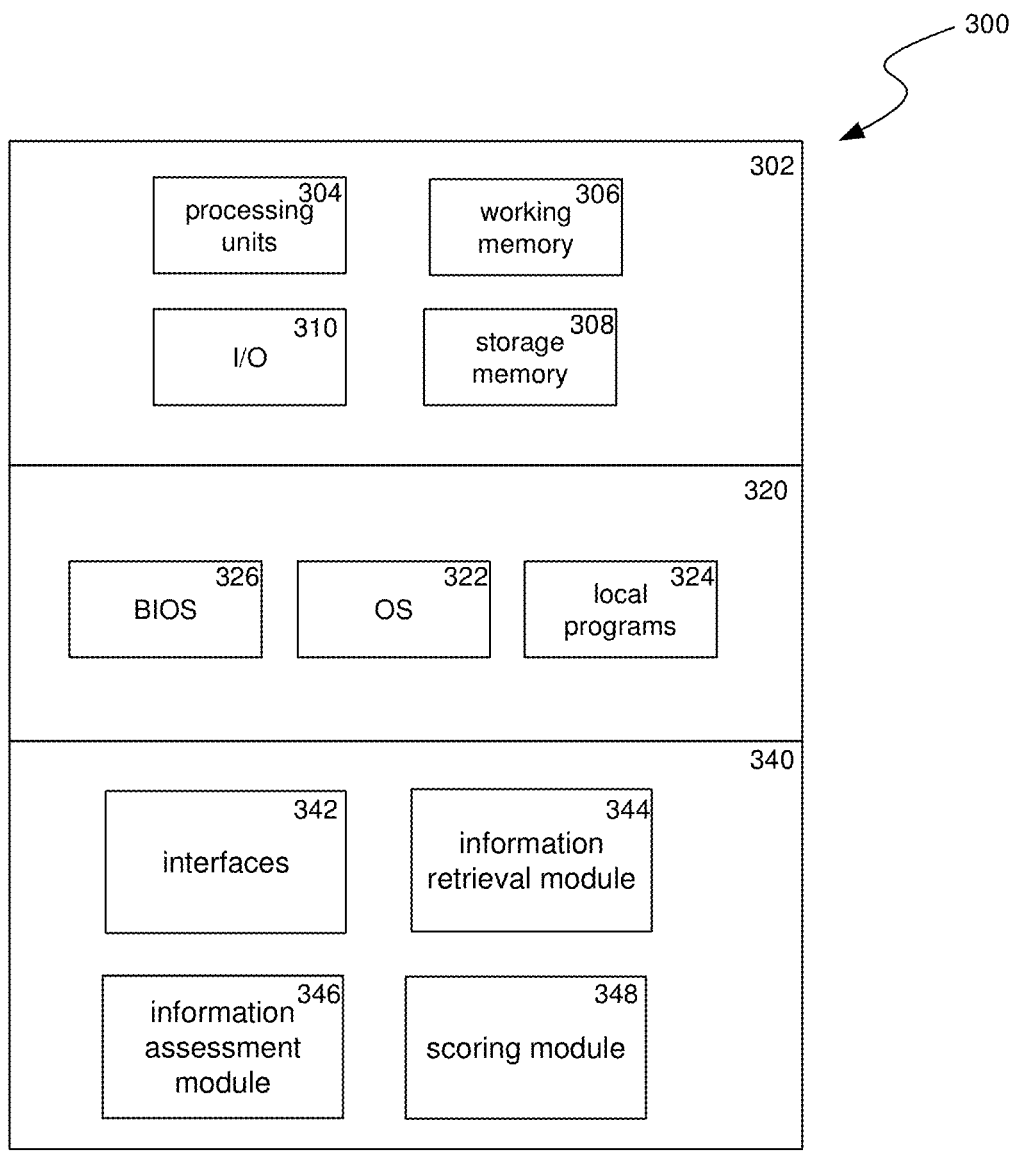
FIG. 3 is a block diagram illustrating components which, in some implementations, can be used in a system employing the disclosed technology.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network. FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an information retrieval module 344, an information assessment module 346, a scoring module 348, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can retrieve information (or data) identifying one or more entities of an organization responsible for carrying out vulnerability management capabilities corresponding to respective entity vulnerability management functions. In this regard, information retrieval module 344 can retrieve definitions for the capabilities such that retrieval of the one or more entities can be accurate. Information retrieval module 344 can retrieve data identifying maturity tiers designating levels of progression for vulnerability management capabilities. Here, the retrieved data can define metrics for assigning vulnerability management capabilities to maturity tiers. Information retrieval module 344 can further retrieve data for one or more technologies (e.g., operational, deployment, and/or development status) regarding supporting of execution of the one or more vulnerability management capabilities. In doing so, information retrieval module 344 can retrieve data for a legend that the vulnerability management program evaluation system 164 can use to score support states of the one or more technologies with respect to vulnerability management capabilities. Additional details on retrieval of the above types of data are provided below in relation to blocks 402, 404, and 406 in FIG. 4.

In some implementations, information assessment module 346 can perform specific assessments as regards relationships between vulnerability management capabilities, maturity tiers, and technologies for supporting execution of the one or more vulnerability management capabilities. For example, information assessment module 346 can determine assignments of vulnerability management capabilities to maturity tiers according to metrics for the tiers and/or for the capabilities. In this regard, the metrics can be specific to the tiers and/or the capabilities such that a capability must satisfy either a tier metric or a corresponding capability metric for that capability before it can be assigned to a respective tier. For instance, if a tier characterizes a stage of capability performance, a corresponding metric for a capability can be a threshold percentage of performance. Other examples of tier or capability metrics can include current publication states (in regard to a standards capability, for instance), stages of development (in regard to a scope capability, for instance), etc. Thus, it can be understood that tier or capability metrics can include, for example, a level of completion, a scheduling status, a priority status, etc.

In these regards, information assessment module 346 can, for example, determine whether a given vulnerability management capability is ongoingly sufficiently supported by one or more respective technologies so as to qualify for assignment to a particular maturity tier. In doing so, information assessment module 346 can monitor corresponding support states (e.g., operational, deployment, and/or development status) of one or more of such respective technologies. This way, information assessment module 346 can link incremental changes in one or more support states to vulnerability management capabilities such that assignments of maturity tiers for the capabilities can be altered on the fly.

In some implementations, information assessment module 346 can assess one or more effects of completed and/or planned vulnerability management projects with respect to the above-discussed vulnerability management capabilities and technologies. Resultingly, information assessment module 346 can factor those effects into, for example, assignment of capabilities to maturity tiers and determination of support states for technologies. Additional details on the assessments performed by information assessment module 346 are provided below in relation to blocks 502 and 504 of FIG. 5, and block 656 of FIG. 6B.

In some implementations, scoring module 348 can compute a depth of current vulnerability management capabilities. In this regard, the term "depth" can be understood as an extent of execution of one or more vulnerability management capabilities, and the term "breadth" can be understood as the degree to which the one or more vulnerability management capabilities are supported for their respective executions (such as by a given technology). To score such current vulnerability management depth, scoring module 348 can score vulnerability management capabilities according to values corresponding to maturity tiers assigned for those capabilities by information assessment module 346. To score such current vulnerability management breadth, scoring module 348 can score technologies supporting execution of vulnerability management capabilities, across the capabilities, according to a predetermined legend. The legend can outline support states for the technologies. To this end, the support states can define, for instance, one or more of an operational, development, and deployment status of a technology for enabling performance of a respective vulnerability management capability.

In some implementations, scoring module 348 can combine the depth and breadth scores to calculate a comprehensive vulnerability management score representing a current vulnerability management status.

In some implementations, scoring module 348 can, using recalculations of the depth and breadth scores to factor in the effects of completed and/or planned vulnerability management projects, recalculate such comprehensive vulnerability management score.

In some implementations, scoring module 348 can generate a report of one or more of a current and a recalculated comprehensive vulnerability management score, as well as their underlying current and/or recalculated individual capability and/or technology scores. Additional details of the scoring performed by the scoring module 348 are provided below in relation to blocks 506, 508, and 510 of FIG. 5, and blocks 658, 660, and 662 of FIG. 6.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
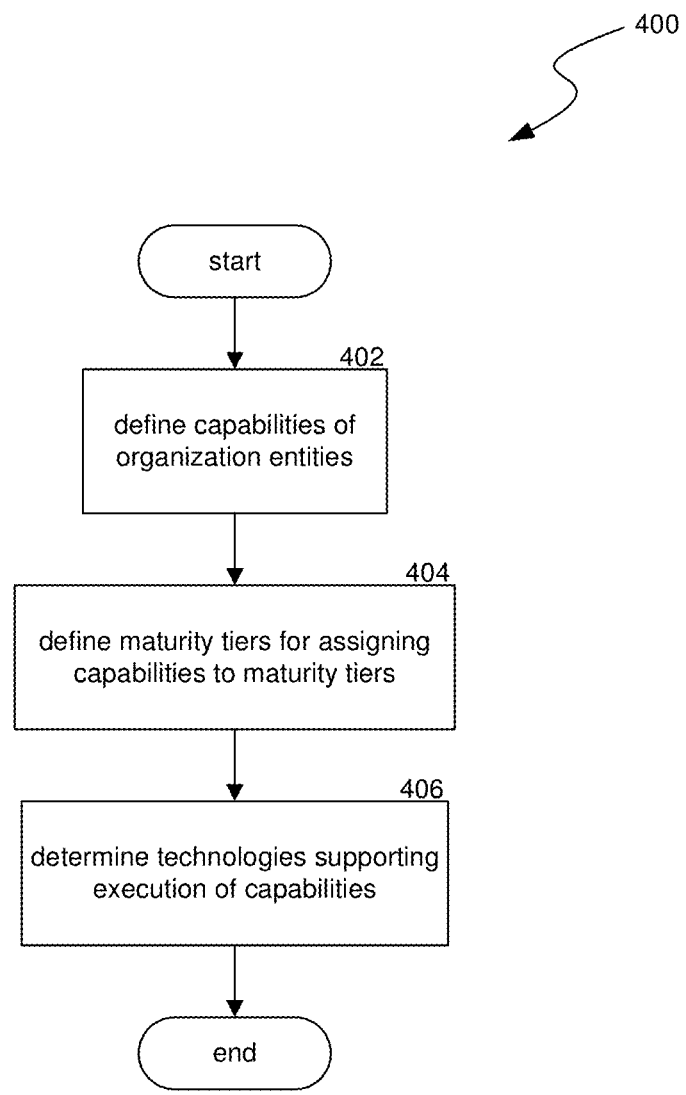
FIG. 4 is a flow diagram illustrating a process used in some implementations for identifying vulnerability management capabilities, maturity tiers for those capabilities, and technologies of an organization that may support execution of the capabilities.

FIG. 4 is a flow diagram illustrating a process 400 used in some implementations for identifying, according to vulnerability management program evaluation system 164 (hereinafter "evaluation system 164"), vulnerability management capabilities, maturity tiers for those capabilities, and technologies of an organization that may support execution of the capabilities. In some implementations, process 400 can be performed on a client device-such as a mobile device executing the evaluation system 164 as part of an app or on a personal computing device as client-side process of a website. In other cases, process 400 can be performed on a server system, e.g., a system serving vulnerability management evaluations via such an app or website. Process 400 can be initiated in response to a user command, such as whenever a user of evaluation system 164 is in need of evaluating vulnerability management status.

At block 402, process 400 can define vulnerability management capabilities for an organization. For instance, process 400 can determine vulnerability management capabilities as one or more steps or efforts that can be taken to substantially eliminate or reduce an effect of a cyber threat. In doing so, process 400 can define the vulnerability management capabilities for entities and corresponding functions within an organization. For instance, each of a group of entities including, for instance, an organization's information security unit, vulnerability governance unit, and information technology unit can have certain vulnerability management capabilities that it can respectively execute. Such vulnerability management capabilities can correspond to one or more functions for the entities including, for example, a management function, an identification function, a response function, and a monitoring function. In these regards, vulnerability management capabilities corresponding to functions can include, but not be limited to, manage health metrics, manage standards, manage scope, manage priorities, as well as ticket, plan, and execute as capabilities for a response functionality. Alternatively or in addition, process 400 can determine vulnerability management capabilities using definitions for those capabilities as delineated by an organization administrator.

At block 404, process 400 can define maturity tiers for assigning vulnerability management capabilities to maturity tiers. In this regard, a maturity tier can designate a level of progression for a given vulnerability management capability. The level of progression can be according to metrics for either the tier itself or a given vulnerability management capability. For instance, if a tier characterizes a stage of capability performance, a corresponding metric for the capability can be a threshold percentage of performance. Thus, only performance of a capability meeting or exceeding the threshold percentage may qualify the capability as being able to be assigned to such a tier. Other examples of tier or capability metrics can include current publication states (in regard to a standards capability, for instance), stages of development (in regard to a scope capability, for instance), etc.

At block 406, process 400 can determine one or more technologies that can support execution of vulnerability management capabilities which have been defined by process 400. Process 400 can determine such one or more technologies using definitions for technologies as delineated by an organization administrator. Alternatively or in addition, process 400 can determine the one or more technologies according to capacities of those technologies. In these regards, such capacities can include, but not be limited to, an exemplary ability of a computer program technology to address scheduling intricacies for a respective capability. For instance, it is contemplated that such a computer program technology could coordinate schedules of various individuals distributed across an organization's business units when those individuals are engaged in developing a vulnerability management project. In another example, the capacities can include an ability of a computer program to calculate certain mathematical results. In this situation, it is contemplated that a particular computer program could analyze underlying criteria affecting probability and severity determinations for a risk assessment matrix, and then produce such a matrix.

Figure 5:
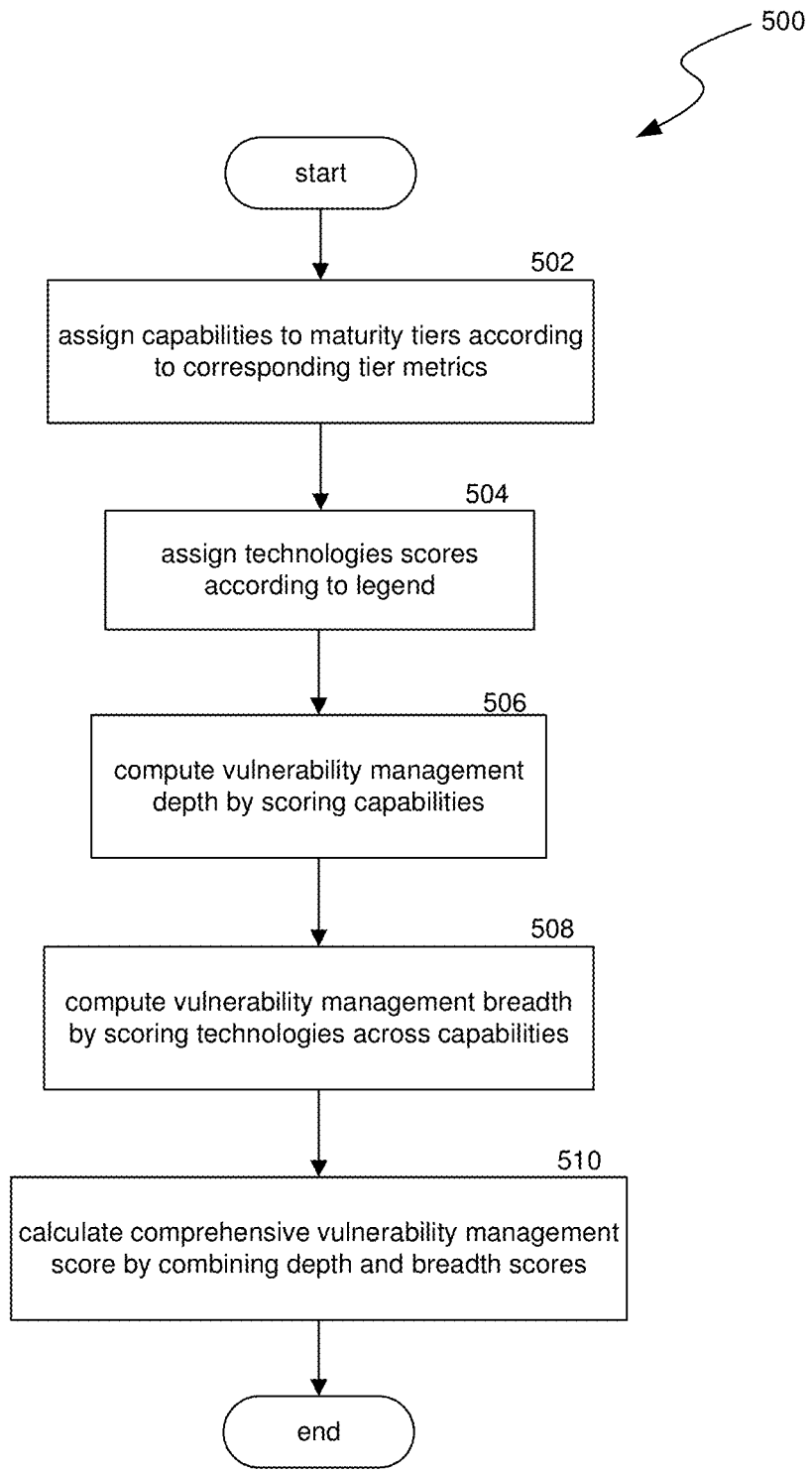
FIG. 5 is a flow diagram illustrating a process used in some implementations for assessing a current state of vulnerability management of the organization according to identified vulnerability management capabilities and technologies.

FIG. 5 is a flow diagram illustrating a process 500 used in some implementations for assessing a current state of vulnerability management of the organization according to identified vulnerability management capabilities and technologies. In some implementations, process 500 can be performed on a client device—such as a mobile device executing the evaluation system 164 as part of an app or on a personal computing device as client-side process of a website. In other cases, process 500 can be performed on a server system, e.g., a system serving vulnerability management evaluations via such an app or website. Process 500 can be initiated whenever a user of evaluation system 164 is in need of evaluating vulnerability management status.

At block 502, process 500 can assign vulnerability management capabilities to maturity tiers according to corresponding metrics. Process 500 can make the assignments according to applicable metrics defined for a particular maturity tier or for a given vulnerability management capability. In this regard, a tier metric can include, for example, a level or stage of completion for a given capability, a result of execution for a given capability, a timeframe for execution of a given capability, etc. Alternatively, a capability metric can include, for example, a threshold percentage of performance of a given capability, a priority for a given capability, etc.

At block 504, process 500 can assign technologies that may support execution of one or more vulnerability management capabilities scores according to a predetermined legend. The legend can outline values corresponding to support states for the technologies. For instance, the support states can indicate an operational, deployment, or development status for technologies enabling performance of one or more respective vulnerability management capabilities.

Exemplary support states and their corresponding values can include, but not be limited to, "A: 3-year desired state is in place and working;" "B: 3-year desired state is defined and development/deployment in progress;" "C: short-term state is in place and working;" "D: short-term state is defined and development/deployment in progress;" and "F: short-term state is undefined." As demonstrated, the support state values can be letter designations. Corresponding numerical or point values can be ascertained according to a predetermined scale.

At block 506, process 500 can compute current vulnerability management depth for an organization by scoring vulnerability management capabilities. To do so, process 500 can determine respective scores for capabilities according to a predetermined value associated with the highest attained maturity tier for a capability. In this way, a respective score for a capability can represent a current vulnerability management depth for that particular capability.

At block 508, process 500 can compute current vulnerability management breadth for an organization by scoring vulnerability management technologies, across each of the vulnerability management capabilities. Process 500 can compute individual scores for the technologies according to the values corresponding to the support states as outlined in the predetermined legend. In this way, a respective score for a technology can represent a current vulnerability management breadth for that particular technology.

At block 510, process 500 can compute a comprehensive current vulnerability management score as the average of aggregated current vulnerability management depth and breadth aggregated scores. To do so, process 500 can, with respect to depth, sum the vulnerability management capability scores and divide by the number of capabilities to yield the aggregated current vulnerability management depth. With respect to breadth, process 500 can sum the vulnerability management technology scores, across capabilities, and divide by the number of capabilities to yield the aggregated current vulnerability management breadth. This way, the average of the depth and breadth values can represent the comprehensive current vulnerability management score which, for instance, can be correlated to a letter grade of "A," "B," etc. according to a predetermined scale.

Figure 6A:
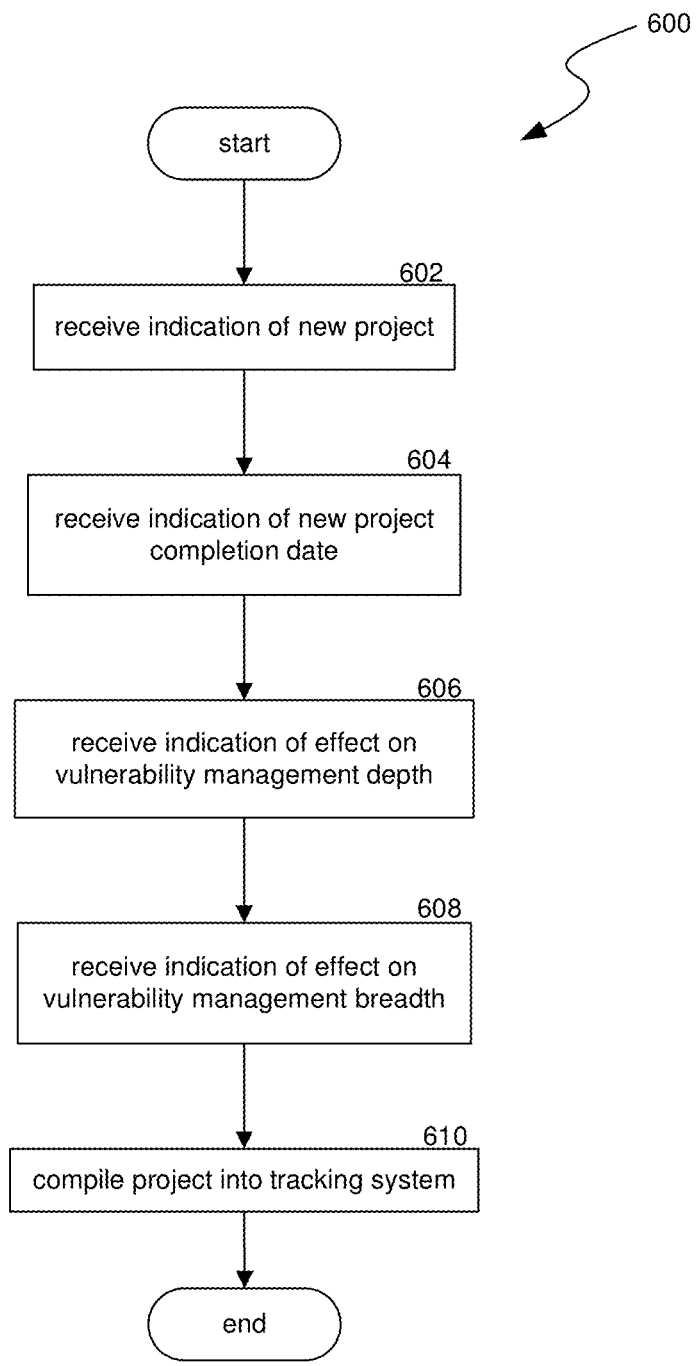
FIG. 6A is a flow diagram illustrating a process used in some implementations for defining a project for vulnerability management.

FIG. 6A is a flow diagram illustrating a process 600 used in some implementations for defining a project for vulnerability management. In some implementations, process 600 can be performed on a client device—such as a mobile device executing the evaluation system 164 as part of an app or on a personal computing device as client-side process of a website. In other cases, process 600 can be performed on a server system, e.g., a system serving vulnerability management evaluations via such an app or website. Process 600 can be initiated whenever a user of evaluation system 164 desires to optimize a current vulnerability management status.

At block 602, process 600 can receive an indication of a new, i.e., planned, vulnerability management project, which can be an effort for optimizing a current vulnerability management status. For instance, the indication can be an entry provided to process 600, via evaluation system 164, describing an effort for vulnerability management. In this regard, a project can include, but not be limited to, assessing a compliance standard, deploying a given vulnerability management technology, assessing potential integration of a vulnerability management technology into a vulnerability management system, implementing threat monitoring procedures, etc.

At block 604, process 600 can receive an indication of an intended completion date for the new project.

At block 606, process 600 can receive an indication of an anticipated effect on vulnerability management depth. In this regard, the indication can describe an expected change in a maturity tier assigned to one or more vulnerability management capabilities or an expected change that can be evaluated against the maturity tier metrics (as defined at block 404 of FIG. 4). For example, the indication can express an expected change in maturity tier that can result from full completion of a capability, where that completion automatically triggers initiation of a related and subsequent capability.

At block 608, process 600 can receive an indication of an anticipated effect on vulnerability management breadth. The received indication can describe an expected change in scores for one or more technologies for vulnerability management or an expected change that can be evaluated against the technology legends (as defined at block 406 of FIG. 4).

At block 610, process 600 can compile the new project according to its description, intended completion date, and indicated anticipated effects on vulnerability management depth and breadth into a project tracking system (as implemented by information assessment module 346, for example). This way, evaluation system 164 can monitor the progress of the new project.

Figure 6B:
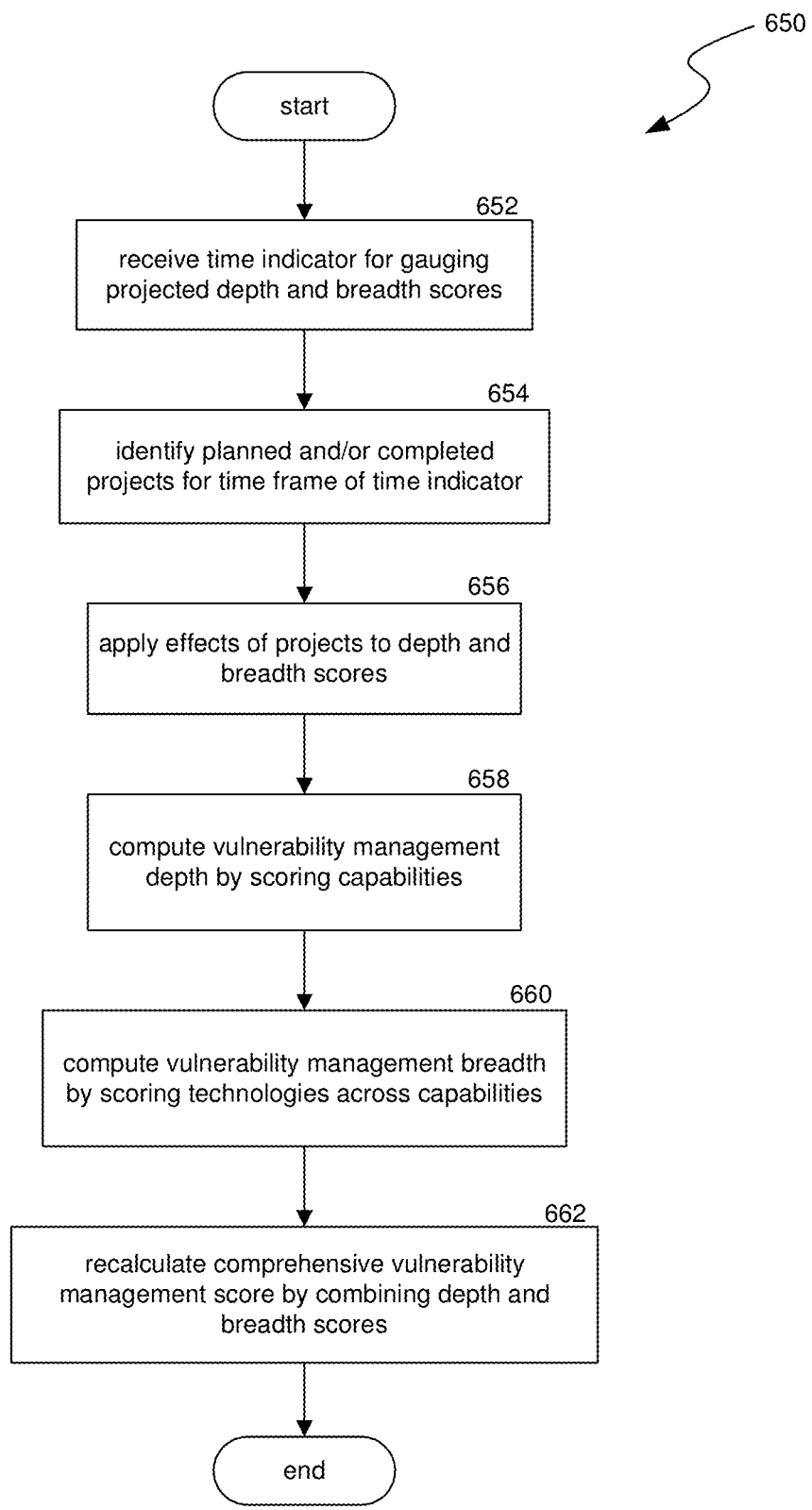
FIG. 6B is a flow diagram illustrating a process used in some implementations for measuring, with respect to a completed or a planned project of FIG. 6A, an effect on vulnerability management.

FIG. 6B is a flow diagram illustrating a process 650 used in some implementations for measuring, with respect to a completed or a planned project of FIG. 6A, an effect on vulnerability management. In some implementations, process 650 can be performed on a client device-such as a mobile device executing the evaluation system 164 as part of an app or on a personal computing device as client-side process of a website. In other cases, process 650 can be performed on a server system, e.g., a system serving vulnerability management evaluations via such an app or website. Process 650 can be initiated whenever a user of evaluation system 164 is in need of evaluating vulnerability management status in light of a new project for vulnerability management.

At block 652, process 650 can receive a time indicator for gauging projected vulnerability management depth and breadth scores for a new project as defined by FIG. 6A. In this regard, the time indicator can be a current or future date/timeframe by which a user of evaluation system 164 can, via process 650, determine an overall expected effect on vulnerability management depth or breadth, or an overall expected effect on vulnerability management status according to the expected depth and/or breadth. For example, the time indicator can be the current day, the first day of Q2 of the next fiscal year, etc.

At block 654, process 650 can identify one or more planned and/or completed vulnerability management projects for the timeframe of the time indicator. To do so, process 650 can inspect the projects defined by tracking system at block 610 in FIG. 6A. This can include identifying any projects that have been set as complete (e.g., if they were completed early and had their status updated) or any projects with a projected completion date set before the date received at block 652.

At block 656, process 650 can apply effects of one or more completed vulnerability management projects and/or can apply expected effects of progress and/or completion of one or more planned vulnerability management projects for the time indicator to current vulnerability management depth and breadth scoring. For instance, any of the noted effects can include a change in maturity level for one or more vulnerability management capabilities or a change in scoring for one or more vulnerability management technologies.

At blocks 658, 660 and 662, process 650 can respectively recalculate, using calculations similar to those executed for blocks 506, 508, and 510 in FIG. 5, the current vulnerability management depth, breadth, and comprehensive score according to the applied effects from block 656. In this way, evaluation system 164 can provide an ongoing assessment of vulnerability management preparedness, especially in view of project tracking that can be performed by its tracking system.

Figure 7:
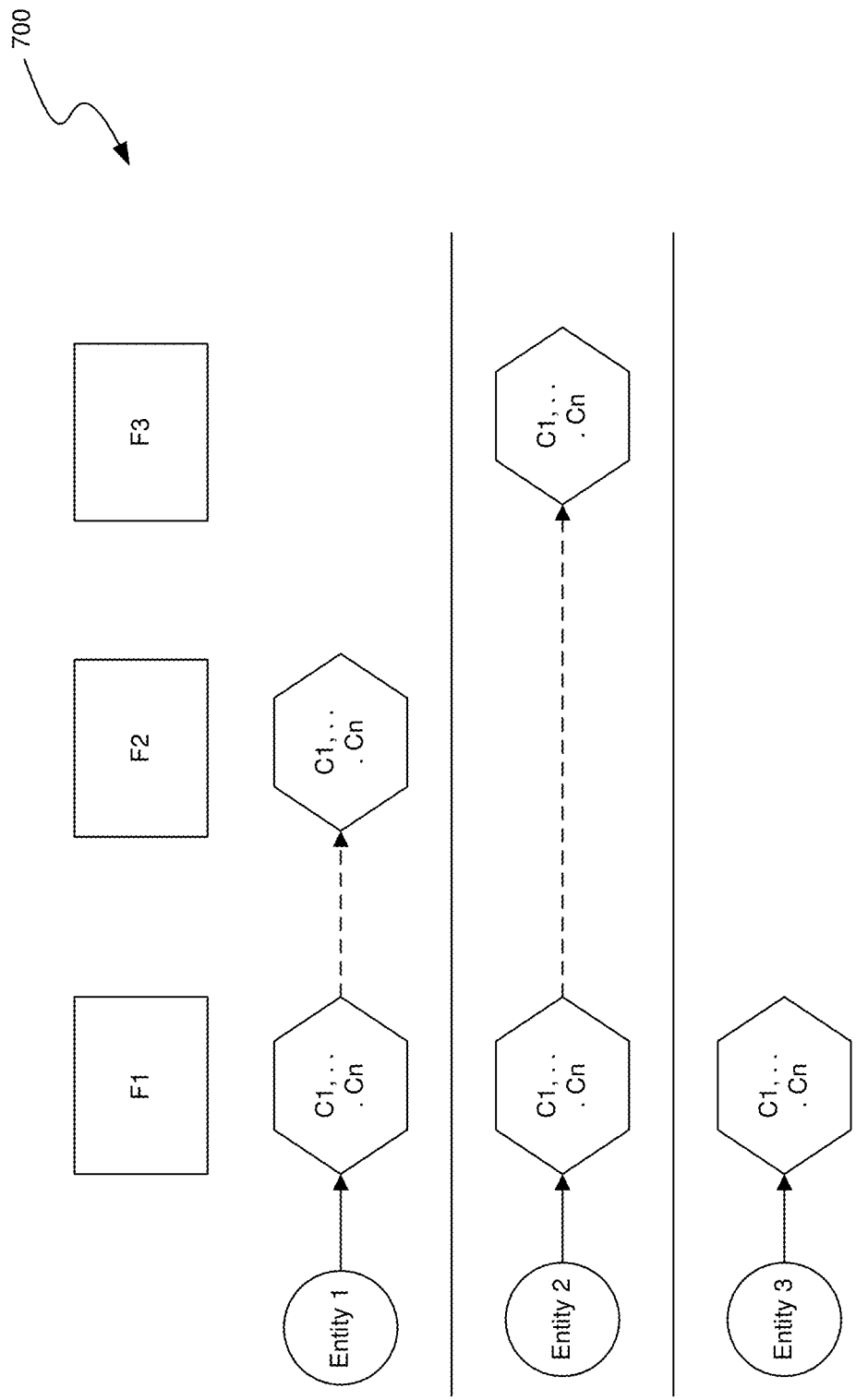
FIG. 7 is a diagram illustrating a division of vulnerability management capabilities of an organization according to assigned entities and functions.

FIG. 7 is a diagram illustrating a division 700 of exemplary vulnerability management capabilities of an organization according to assigned entities and functions. Therein, vulnerability management capabilities can include those of C1 to Cn, according to the shown entities Entity 1, Entity 2, and Entity 3. For example, Entity 1 can correspond to the organization's information security unit, which can be responsible for a health metrics capability. In another example, Entity 2 can correspond to the organization's vulnerability governance unit, which can be responsible for an array of capabilities including health metrics, standards, scope, priorities, etc. In still another example, Entity 3 can represent the organization's information technology unit, which can be responsible for capabilities such as health metrics and scanning of infrastructure. In some cases, capabilities can be described in terms of, cross-entity functions, such as Functions F1, F2, and F3. Such capabilities can correspond to one or more functions for the entities including, for example, a management function, an identification function, a response function, and a monitoring function. In these regards, capabilities corresponding to functions can include, but not be limited to, manage health metrics, manage standards, manage scope, manage priorities, as well as ticket, plan, and execute as capabilities for a response functionality.

Figure 8:
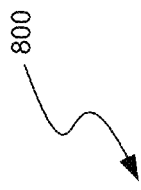
FIG. 8 is a diagram illustrating determining of a current depth of vulnerability management.

FIG. 8 is a diagram illustrating a determining 800 of a current depth of vulnerability management. As shown, each of capabilities 1-7 is assigned to its appropriate maturity tier from among maturity tiers (Partial), (Risk Informed), (Repeatable), and (Adaptive). As discussed with reference to block 502 of FIG. 5, assignments of the respective maturity tiers associate corresponding maturity tier values to the capabilities. Accordingly, a current depth of vulnerability management for each of the illustrated capabilities can be defined by the associated maturity tier value (e.g., Tier Value=2 for Capability 1, etc.). Overall current vulnerability management depth can be determined by summing the maturity tier values and dividing by the number of capabilities to arrive at the Depth Score of 2.29.

Figure 9:
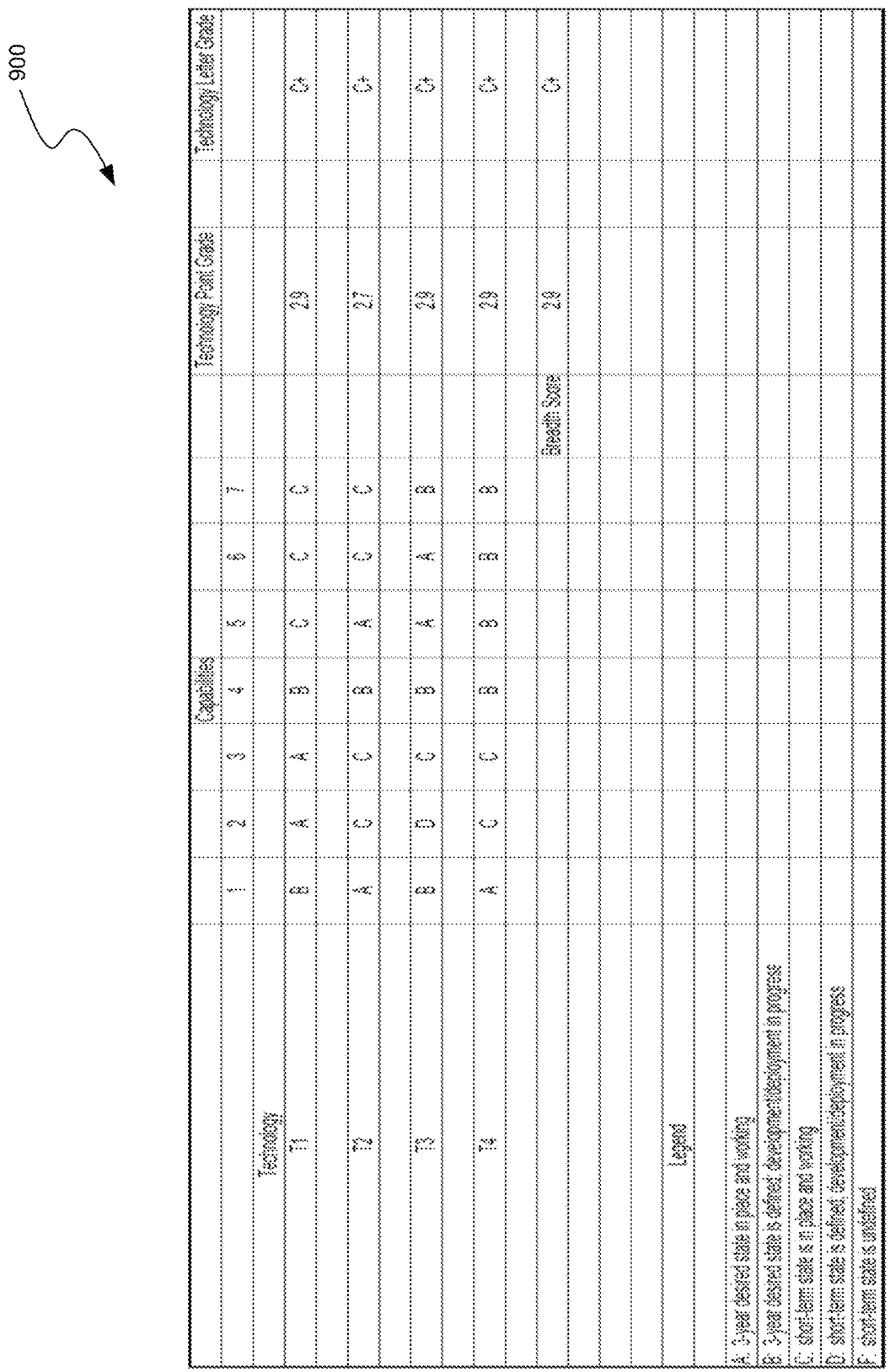
FIG. 9 is a diagram illustrating a determining of a current breadth of vulnerability management.

FIG. 9 is a diagram illustrating a determining 900 of a current breadth of vulnerability management. Therein, shown are vulnerability management technologies T1, T2, T3, and T4 that can support execution of vulnerability management capabilities 1-7, where each technology is scored (according to point and letter grades) according to the legend. Examples of T1, T2, T3, and T4 can include programs addressing infrastructure vulnerability, cloud account configuration(s), encryption protocol, etc. In determining the point grades, a predetermined scale is assigned to grading A-F as provided in the legend. In these regards, a breadth of vulnerability management can be provided for each of the technologies by summing corresponding point values across capabilities 1-7 and dividing by the number of capabilities to arrive at a Technology Point Grade. Such Technology Point Grade can then be converted to a Technology Letter Grade in accordance with the predetermined scale. Overall current vulnerability management breadth can then be determined in terms of an overall Technology Point Grade by summing the individual Technology Point Grades for technologies T1-T4 and dividing by the number of technologies, where the quotient can then be converted to the corresponding Technology Letter Grade according to the predetermined scale.

Figure 10A:
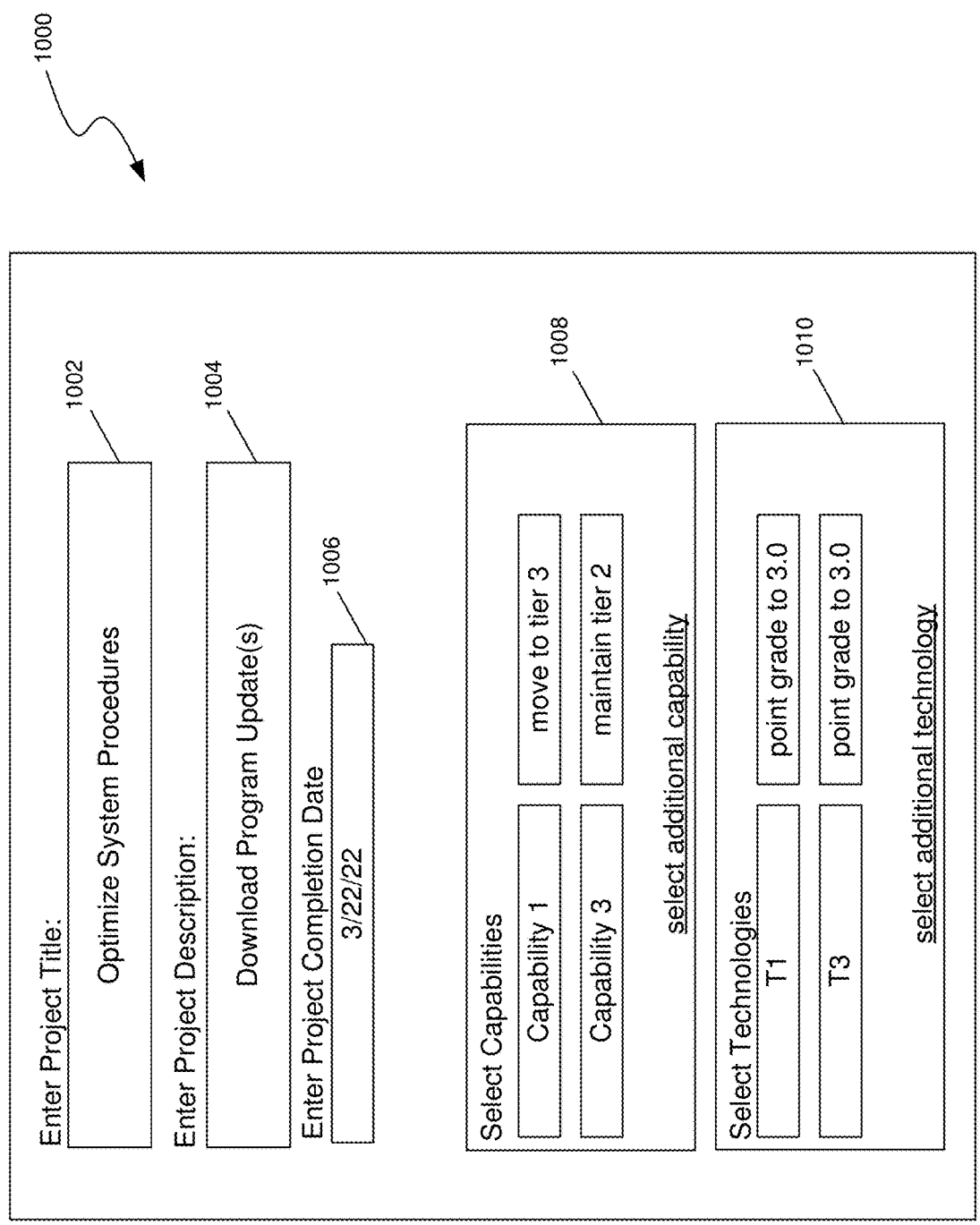
FIG. 10A illustrates an exemplary user interface for which details of a planned project for vulnerability management are provided.
Figure 10B:
FIG. 10B is a diagram illustrating an effect on a depth of vulnerability management according to the planned project of FIG. 10A.
Figure 10C:
FIG. 10C is a diagram illustrating an effect on a breadth of vulnerability management according to the planned project of FIG. 10A.

FIG. 10A illustrates an exemplary user interface 1000 of evaluation system 164 which can convey details of a planned project for vulnerability management. FIGS. 10B and 10C illustrate diagrams respectively providing an effect on a depth and a breadth of current vulnerability management according to the planned project of FIG. 10A.

As shown in FIG. 10A, a user can enter the title and description for a planned vulnerability management project at blocks 1002 and 1004, respectively. As shown, the user has entered the title, "Optimize System Procedures" corresponding to the description of "Download Program Update(s)." At block 1006, the user can enter an anticipated completion date for the project, i.e., Mar. 22, 2022. In view of the updates that will occur, evaluation system 164 can determine the effects of the project both in terms of an effect on vulnerability management capabilities at block 1008 and an effect on vulnerability management technologies at block 1110. For the determined effects, the user can, at block 1008 activate the "select additional capability" link to select various ones of the defined capabilities-Capabilities 1-7 in this example—to set any specific expected impact which would result from the updates being performed. In this case, the user has selected Capabilities 1 and 3 for which anticipated effects due to the project (i.e., "move to tier 3," and "maintain tier 2") are adjacently displayed (see FIGS. 8 and 10B). Similarly, the user can, at block 1010, activate the "select additional technology" link to select various ones of the defined technologies-Technologies 1-4 in this example—to set an expected impacts as a result of the project. As shown, the user has selected Technologies T1 and T3, each of which is shown to expect a rise in Technology Point Grade from 2.9 to 3.0 (see FIGS. 9 and 10C).

In referring to FIGS. 8 and 10B, evaluation system 164 can recalculate the current depth and breadth of vulnerability management of 2.29 and 2.9, respectively (as shown in FIG. 8) as an updated depth of 2.43 (FIG. 10B) and an updated breadth of 2.9 (FIG. 10C). In these ways, evaluation system 164 cannot only determine recalculations of individual vulnerability management depth and breadth (and a corresponding comprehensive score, i.e., the average of updated depth and breadth) as they pertain to expected effects of projects that are to be completed in the future. That is, evaluation system 164 can track the various stages of performance of a to be completed project and provide recalculations for vulnerability management throughout those stages. This way, evaluation system 164 can determine ongoing real-time assessments of vulnerability management solutions (i.e., capabilities and supporting technologies).

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for measuring vulnerability management program readiness, the method comprising:
    defining two or more maturity tiers each designating a level of progression for one or more vulnerability management capabilities;
    determining one or more technologies respectively supporting execution of the one or more vulnerability management capabilities;
    assessing a current vulnerability management status of an organization by:
        computing a depth of current vulnerability management by scoring each of the one or more vulnerability management capabilities according to values corresponding to maturity tiers assigned to each of the one or more vulnerability management capabilities;
        computing a breadth of current vulnerability management based on scores for each of the one or more technologies, across capabilities; and
        combining the depth and the breadth scores to calculate a comprehensive vulnerability management score;
    recalculating the comprehensive vulnerability management score based on completion and/or projected completion of one or more vulnerability management projects that each correspond to an effort for optimizing the current vulnerability management status,
    wherein the recalculating the comprehensive vulnerability management score is based on receiving a time indicator, identifying the one or more vulnerability management projects for the time indicator, and applying one or more effects of the one or more vulnerability management projects to the computed depth and breadth of vulnerability management; and
    providing an output including the recalculated comprehensive vulnerability management score.

2. The method of claim 1,
    wherein metrics are defined for assigning vulnerability management capabilities to maturity tiers; and
    wherein the metrics comprise at least one or more of (a) a level of completion for a capability, (b) a scheduling status for a capability, (c) a priority status for a capability, or (d) any combination thereof.

3. The method of claim 1,
    wherein one or more support states are used to score technologies for a capability; and
    wherein each of the one or more support states corresponds to an operational status, a deployment status, or a development status of a respective technology for enabling performance of a respective vulnerability management capability of the one or more vulnerability management capabilities.

4. The method of claim 1,
    wherein the depth of current vulnerability management corresponds to an extent of execution of the one or more vulnerability management capabilities; and
    wherein the breadth of current vulnerability management corresponds to a degree to which the one or more vulnerability management capabilities are supported for their respective executions by the one or more technologies.

5. The method of claim 1,
    wherein the output comprises each of current individual depth and breadth scores defined by the recalculated comprehensive vulnerability management score.

6. A computer-readable storage medium storing instructions, for measuring vulnerability management program readiness, the instructions, when executed by a computing system, cause the computing system to:
    define two or more maturity tiers each designating a level of progression for one or more vulnerability management capabilities;
    determine one or more technologies respectively supporting execution of the one or more vulnerability management capabilities;
    assess a current vulnerability management status of an organization by:
        computing a depth of current vulnerability management by scoring each of the one or more vulnerability management capabilities according to values corresponding to maturity tiers assigned to each of the one or more vulnerability management capabilities;

computing a breadth of current vulnerability management based on scores for each of the one or more technologies, across capabilities; and combining the depth and the breadth scores to calculate a comprehensive vulnerability management score; and recalculate the comprehensive vulnerability management score based on completion and/or projected completion of one or more vulnerability management projects that each correspond to an effort for optimizing the current vulnerability management status, wherein the recalculating the comprehensive vulnerability management score is based on receiving a time indicator, identifying the one or more vulnerability management projects for the time indicator, and applying one or more effects of the one or more vulnerability management projects to the computed depth and breadth of vulnerability management; and provide an output including the recalculated comprehensive vulnerability management score.

7. The computer-readable storage medium of claim 6, wherein metrics are defined for assigning vulnerability management capabilities to maturity tiers; and wherein the metrics comprise at least one or more of (a) a level of completion for a capability, (b) a scheduling status for a capability, (c) a priority status for a capability, or (d) any combination thereof.

8. The computer-readable storage medium of claim 6, wherein one or more support states are used to score technologies for a capability; and wherein each of the one or more support states corresponds to an operational status, a deployment status, or a development status of a respective technology for enabling performance of a respective vulnerability management capability of the one or more vulnerability management capabilities.

9. The computer-readable storage medium of claim 6, wherein the depth of current vulnerability management corresponds to an extent of execution of the one or more vulnerability management capabilities; and wherein the breadth of current vulnerability management corresponds to a degree to which the one or more vulnerability management capabilities are supported for their respective executions by the one or more technologies.

10. The computer-readable storage medium of claim 6, wherein the output comprises each of current individual depth and breadth scores for the recalculated comprehensive vulnerability management score.

11. A computing system for measuring vulnerability management program readiness, the computing system comprising:

one or more processors; and one or more memories storing instructions that, when executed by the one or more processors, cause the computing system to:

define two or more maturity tiers each designating a level of progression for one or more vulnerability management capabilities;

determine one or more technologies respectively supporting execution of the one or more vulnerability management capabilities;

assess a current vulnerability management status of an organization by:

computing a depth of current vulnerability management by scoring each of the one or more vulnerability management capabilities according to values corresponding to maturity tiers assigned to each of the one or more vulnerability management capabilities;

computing a breadth of current vulnerability management based on scores for each of the one or more technologies, across capabilities; and combining the depth and the breadth scores to calculate a comprehensive vulnerability management score;

recalculate the comprehensive vulnerability management score based on completion and/or projected completion of one or more vulnerability management projects that each correspond to an effort for optimizing the current vulnerability management status, wherein the recalculating the comprehensive vulnerability management score is based on receiving a time indicator, identifying the one or more vulnerability management projects for the time indicator, and applying one or more effects of the one or more vulnerability management projects to the computed depth and breadth of vulnerability management; and provide an output including the recalculated comprehensive vulnerability management score.

12. The computing system of claim 11, wherein metrics are defined for assigning vulnerability management capabilities to maturity tiers; and wherein the metrics comprise at least one or more of (a) a level of completion for a capability, (b) a scheduling status for a capability, (c) a priority status for a capability, or (d) any combination thereof.

13. The computing system of claim 11, wherein one or more support states are used to score technologies for a capability; and wherein each of the one or more support states corresponds to an operational status, a deployment status, or a development status of a respective technology for enabling performance of a respective vulnerability management capability of the one or more vulnerability management capabilities.

14. The computing system of claim 11, wherein the depth of current vulnerability management corresponds to an extent of execution of the one or more vulnerability management capabilities; and wherein the breadth of current vulnerability management corresponds to a degree to which the one or more vulnerability management capabilities are supported for their respective executions by the one or more technologies.

15. The computing system of claim 11, wherein the output comprises each of current individual depth and breadth scores for the recalculated comprehensive vulnerability management score.

\* \* \* \* \*